Aug. 19, 1969    C. J. NEWMAN ET AL    3,462,207
CABINET INSTALLATION WITH MIRROR LOCK
Filed Sept. 26, 1967
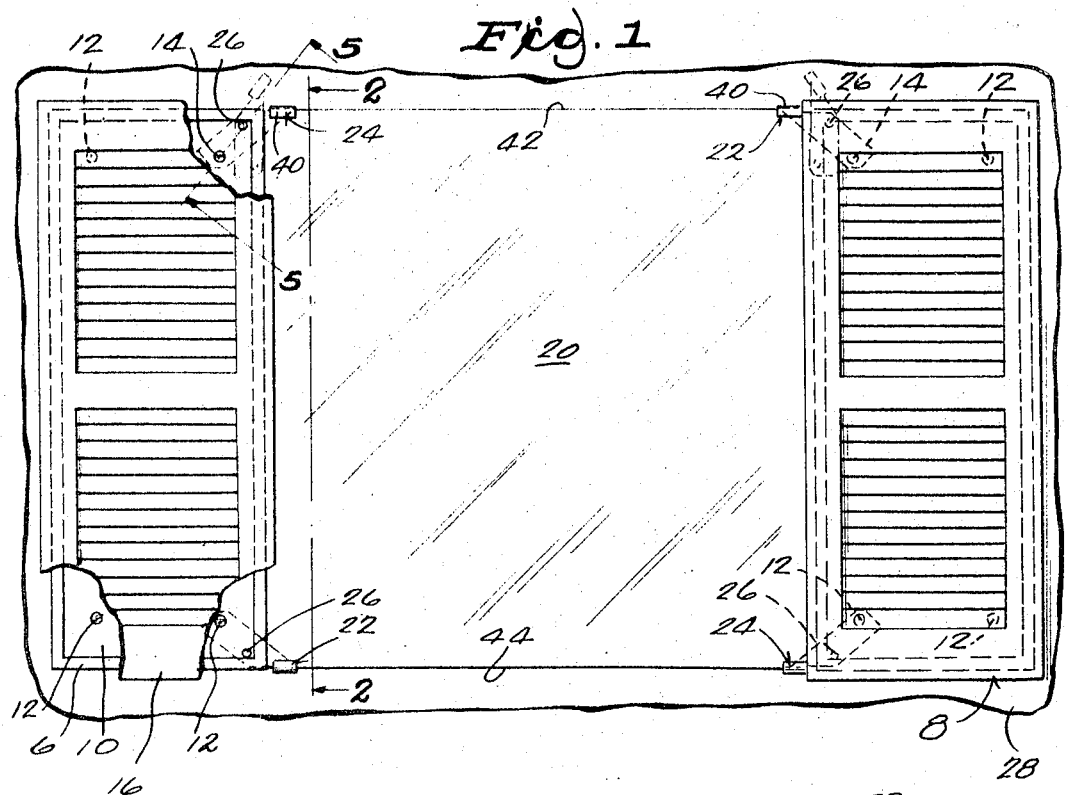
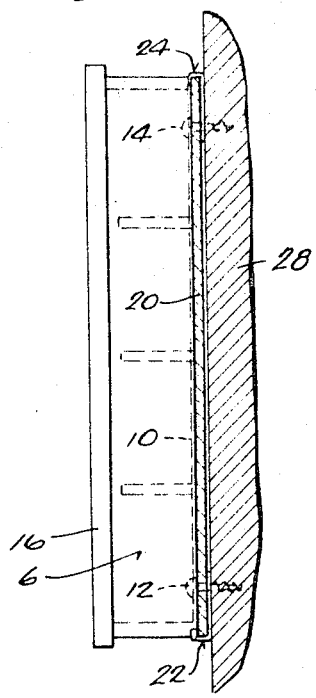
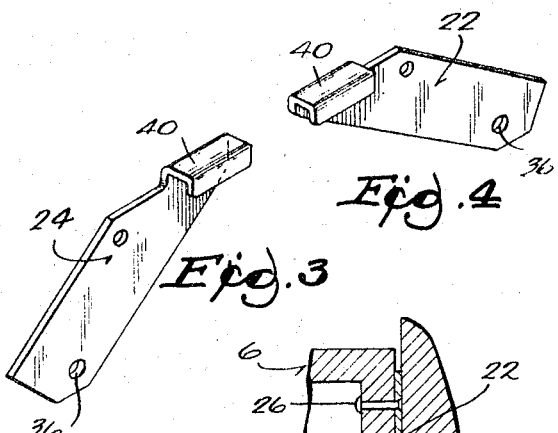
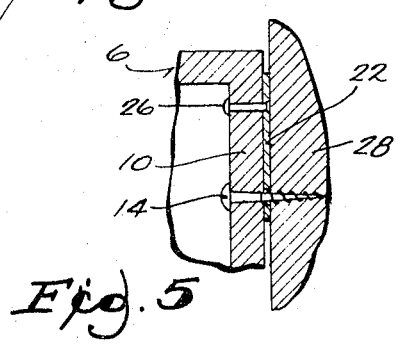
INVENTORS
CHARLES J. NEWMAN
WILLIAM G. BROSENE, Jr.
BY Wheeler, Wheeler, Houser & Clemency
ATTORNEYS

United States Patent Office 3,462,207
Patented Aug. 19, 1969

3,462,207
CABINET INSTALLATION WITH MIRROR LOCK
Charles J. Newman and William G. Brosene, Jr., Madison, Ind., assignors to The Grote Manufacturing Company, Inc., a corporation of Kentucky
Filed Sept. 26, 1967, Ser. No. 670,527
Int. Cl. A47b *67/02, 67/00*
U.S. Cl. 312—245        5 Claims

ABSTRACT OF THE DISCLOSURE

Laterally spaced cabinets individually usable without a mirror have rear walls to which are attached brackets for the support of a mirror extending between such cabinets. The lower two brackets are fixed to the respective cabinets; the upper two brackets are pivoted for movement between mirror-retaining and mirror-releasing positions and are anchored in the respective mirror-retaining positions by screws or the like which also contribute to the support of the cabinets.

Background of the invention

There has been considerable demand for a mirror mounting device usable in connection with bathroom cabinets and capable of preventing mirror pilferage while, at the same time, providing ready release when the mirror requires replacement on account of breakage or loss of quality of reflection.

Except for being allochiral, the brackets used are identical. Each includes a channel engageable with the margin of a mirror. Each is connected with the respective cabinet at one point and held by the cabinet mounting screw at another point. In the case of the lower brackets these two points are both fixed. In the case of the upper brackets, the bracket is pivoted at one of its points of connection and is attached to the cabinet and preferably also to the wall at its other point of mounting. Use of pilfer-resistant screws, bolts or nuts for the mounting is helpful but even without these, the mirror connection to the cabinet is such as to discourage casual pilferage because the only movable part that is visible in the cabinet is the usual mounting screw for the cabinet itself.

Summary of the invention

The invention consists of the provision of special brackets attached to a bathroom cabinet or cabinets, each bracket being channeled to receive the margin of a mirror and one or more of the brackets being pivotally movable as to permit mirror withdrawal and replacement. The mounting of the brackets preferably includes the screws or the like used to mount the cabinets themselves, the connection of the brackets to the mounting means being achieved behind the respective cabinets and hence out of sight of anyone seeking to remove the mirror.

Brief description of the drawings

FIG. 1 is a view in front elevation of a cabinet and mirror installation embodying the invention, portions being broken away.

FIG. 2 is a view taken in section on the line 2—2 of FIG. 1.

FIG. 3 is an enlarged detail view in perspective showing a bracket embodying the invention as used at the upper left and lower right in FIG. 1.

FIG. 4 is a view similar to FIG. 3 showing in perspective the brackets used at the lower left and upper right in FIG. 1.

FIG. 5 is a fragmentary detail view on enlarged scale taken in section on the line 5—5 of FIG. 1.

Detailed description

Each of the cabinets 6 and 8 includes a back wall 10 through which extend any desired mounting screws or bolts such as those shown at 12 and 14. The cabinets shown have doors at 16. The construction of the cabinets may be varied as desired, forming no part of the present invention.

The mirror 20 which extends between the cabinets 6 and 8 is carried by fixed brackets 22 and 24 which project from the back walls 10 of the respective cabinets 6 and 8. Each of the brackets 22 and 24 as used at the bottom of mirror 20 is preferably fixed by connection at two points. One of these may be the cabinet mounting screw but either or both may be rivets 26. Passing through the back walls are the mounting screws 12 which support the respective cabinets from the wall 28 upon which they are to be mounted.

At the left end of the top of the mirror a bracket 24 identical with that used at the bottom right corner of the mirror is pivoted to the associated cabinet 6 either by means of rivet 26 or a pilfer-resistant bolt. The screw or other fastener used at 14 goes through the back wall 10 of the cabinet 6 and through the opening 36 of the bracket into the bathroom wall fragmentarily illustrated at 28. This screw or fastener 14 appears to be identical with those used at 12. There is therefore nothing to indicate to a would-be thief that it performs any function other than those performed by the other screws or fasteners which support the cabinet. However, when the screw or fastener 14 is withdrawn, the bracket 24 is pivotally movable to the position shown in dotted lines in FIG. 1, thereby releasing its channel portion 40 from its normal engagement with the upper margin 42 of the mirror 20.

Similarly, the fastener at the upper right end of the mirror is identical with that shown at 22 at the lower left. Like the fastener at the upper left, the fastener at the upper right is mounted on cabinet 8 by means of a rivet or other pilfer-resistant fastener at 26 and a screw or other mounting 14 so that it likewise may be pivoted between the mirror-retaining position shown in full lines and the mirror-releasing position shown in dotted lines in FIG. 1.

With both of the upper retaining brackets 22 and 24 pivoted to the dotted line positions of FIG. 1, the mirror will be completely free to be lifted from the channels 40 of the fixed brackets which support the lower margin 44 of the mirror. Each cabinet remains securely mounted notwithstanding removal of the screw which holds the top bracket against pivotal movement, since the cabinets will each have three remaining mounting screws.

The fact that the upper brackets may be pivoted to their respective mirror-releasing positions upon removal of the mounting fasteners 14 is not apparent to the observer. Also, the anchoring of the pivoted brackets by the use of the fasteners which mount the cabinets themselves is a labor-saving expedient both in the original mounting and in the replacement of the mirror.

It is contemplated that the cabinets may be used without the brackets when the mirror mounting arrangement is not required.

We claim:

1. A mirror and wall cabinet combination characterized in that the wall cabinet has mounting means and laterally projecting mirror-positioning brackets, each bracket including at least one permanent connection to the wall cabinet, and at least one bracket being pivotal upon such connection and having a first portion behind the cabinet through which one said cabinet mounting means extends and secures the bracket against pivotal movement and having a second portion projecting laterally from the cabinet and provided with a mirror-engaging channel, the second portion being movable to and from operative mirror-engaging position in the pivotal movement of the bracket respecting the cabinet when the bracket is released for pivotal movement by withdrawal of said one cabinet mounting means.

2. A mirror and wall cabinet combination according to claim 1 in which the brackets are respectively located adjacent the top and bottom of one side of the cabinet and the mirror has its upper and lower margins so spaced as to be engaged simultaneously by the respective brackets, the brackets having channels in which the upper and lower margins of the mirror are respectively engaged to be positioned thereby, the lower bracket having its position fixed to receive the lower margin of the mirror and the upper bracket having mirror-retaining and mirror-releasing positions between which its second portion is movable in the course of pivotal movement of the upper bracket.

3. A combination according to claim 1 in further combination with a second cabinet spaced from the first cabinet, a mirror disposed between said cabinets, each said cabinet having lower mirror-mounting brackets with channels in positioning engagement with the lower margin of the mirror and each such cabinet having upper brackets provided with mirror-positioning channels normally engaged with the upper margin of the mirror, said upper brackets being pivotally connected with their respective cabinets for movement between mirror-engaging and mirror-releasing positions and each having an aperture through which said cabinet mounting means removably projects to secure the bracket in its mirror-engaging position.

4. The combination with laterally spaced wall cabinets and an intervening mirror, of mounting means for the respective wall cabinets including threaded fasteners extending rearwardly from upper and lower corners of respective cabinets at the sides thereof nearest said mirror, brackets having means pivotally connecting them to the respective cabinets at their upper and lower corners nearest said mirror, the respective brackets at the upper corners of the respective cabinets having arms provided with apertures through which said fasteners extend, the brackets at the lower corners of said cabinets being relatively fixed against pivotal movement, all of said brackets having arms extending outwardly from the respective cabinets and provided with channels respectively engaged with upper and lower margins of the mirror, the brackets at the upper corners of the respective cabinets being pivotally movable to disengage the channeled arms from the mirror when the fasteners are removed from the apertured arms of said brackets, thereby permitting the brackets pivotal movement in a direction to disengage their respective channels from the mirror.

5. A combination according to claim 4 in which each of the brackets has angularly related arms, the brackets at the top of each of said cabinets being related allochirally to the brackets in corresponding positions on the other of said cabinets.

References Cited

UNITED STATES PATENTS

| 2,708,147 | 5/1955 | Duggan et al. | 312—245 X |
| 3,347,504 | 10/1967 | Goss | 248—488 |
| 3,353,887 | 11/1967 | Cihlar | 312—245 |

CASMIR NUNBERG, Primary Examiner

U.S. Cl. X.R.

248—488; 312—224